(12) United States Patent
Apfel et al.

(10) Patent No.: US 8,639,229 B2
(45) Date of Patent: Jan. 28, 2014

(54) CREATING A COMMUNICATION GROUP

(75) Inventors: Darren A. Apfel, Redmond, WA (US); Jon Friedman, Seattle, WA (US); Keith L. Rowe, Seattle, WA (US); Rosanna H. Ho, Kirkland, WA (US); Sandra I. Vargas, Sammamish, WA (US); Peter A. Bernard, Bellevue, WA (US); Matthew Justin Von Bencke, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1239 days.

(21) Appl. No.: 12/016,104

(22) Filed: Jan. 17, 2008

(65) Prior Publication Data

US 2009/0186605 A1 Jul. 23, 2009

(51) Int. Cl.
*H04M 3/44* (2006.01)

(52) U.S. Cl.
USPC .................. 455/416; 455/575.1; 755/736

(58) Field of Classification Search
USPC ................. 455/416, 466, 575.1; 715/736
See application file for complete search history.

(56) References Cited

U.S. PATENT DOCUMENTS

| | | | | |
|---|---|---|---|---|
| 6,204,844 | B1 * | 3/2001 | Fumarolo et al. | 715/736 |
| 2003/0107601 | A1 * | 6/2003 | Ryzhov | 345/769 |
| 2003/0119540 | A1 | 6/2003 | Mathis | |
| 2003/0197736 | A1 * | 10/2003 | Murphy | 345/780 |
| 2005/0143135 | A1 | 6/2005 | Brems | |
| 2006/0009249 | A1 | 1/2006 | Fu | |
| 2006/0046759 | A1 | 3/2006 | Yoon | |
| 2006/0077958 | A1 | 4/2006 | Mallya | |
| 2006/0223518 | A1 | 10/2006 | Haney | |
| 2006/0276213 | A1 * | 12/2006 | Gottschalk et al. | 455/518 |
| 2007/0047950 | A1 | 3/2007 | Asami | |
| 2007/0117576 | A1 | 5/2007 | Huston | |
| 2007/0197250 | A1 | 8/2007 | Kies | |
| 2007/0220005 | A1 | 9/2007 | Castro Castro | |
| 2007/0281716 | A1 * | 12/2007 | Altman et al. | 455/466 |
| 2008/0020810 | A1 * | 1/2008 | Park | 455/575.1 |

OTHER PUBLICATIONS

"Adding a personal group", http://publib.boulder.ibm.com/infocenter/stmhelp/v7r5/index.jsp?topic=/com.ibm.help.sametime.mobile.doc/stm_contacts_add_group.html, Nov. 6, 2007.
"Manage Your Contact List", http://office.microsoft.com/en-us/help/HA102224361033.aspx, Apr. 17, 2008.
"Contact Groups", http://zapr.typepad.com/help/2006/01/contact_groups.html, Jan. 29, 2006.
"Push!Photo: Informal Photo Sharing in Ad-Hoc Networks", http://ecagents.istc.cnr.it/dllink.php?id=288&type=Document, Apr. 17, 2008.

* cited by examiner

*Primary Examiner* — Patrick Edouard
*Assistant Examiner* — Myron K Wyche
(74) *Attorney, Agent, or Firm* — Wolfe-SBMC

(57) ABSTRACT

This document describes tools capable of enabling users of mobile communication devices to create communication groups quickly and easily. With such a communication group a user may call, text, or instant message all persons in the group at once by selecting the communication group rather than each person in the group. In one embodiment, the tools enable a user to build a communication group by dragging and dropping indicators for persons he or she knows from one area of a screen into another area. In another embodiment, the tools automatically collect persons from those that the user knows based on one or more criteria. The user may then easily create a communication group of those collected persons, such as by tapping on an area of a mobile device's display.

20 Claims, 10 Drawing Sheets

CREATING A COMMUNICATION GROUP

BACKGROUND

Current mobile communication systems and devices, such as cellular networks and phones, permit users to communicate with more than one person at once. To do so, however, a user typically has to select separately and through a slow or complicated process each person for each communication.

For instant messaging, for example, a user may start a conversation with a first friend, then select from a list of contacts to add a second friend, and then select from the list to add a third friend. For conference calls, a user may call a first friend and then, once connected, call a second friend, and then once connected to both friends join the two calls, then call a third friend, and once connected join the first two calls and the third call to create a conference call with the three friends.

Further still, current mobile communication systems and devices may require a user wanting to communicate with the same set of people with which the user has already communicated to re-select each of those people one-by-one.

SUMMARY

This document describes tools capable of enabling users of mobile communication devices to create communication groups quickly and easily. With such a communication group a user may call, text, file share, or instant message all persons in the group at once by selecting the communication group rather than each person in the group. In one embodiment, the tools enable a user to build a communication group by dragging and dropping indicators for persons he or she knows from one area of a screen into another area. In another embodiment, the tools automatically collect persons from those that the user knows based on one or more criteria. The user may then easily create a communication group of those collected persons, such as by tapping on an area of a mobile device's display.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Current mobile communication systems and devices, such as cellular networks and phones, typically require that a user select separately and through a slow or complicated process each person with which the user wants to communicate and the desired type of communication (e.g., text or voice).

Consider for example Sophie Carmichael, a cellular phone user. She has fifty-four contacts on her phone and wants to call three of them at once. These three friends, Arjune, Brittany, and Calvin are going to a "Jars of Clay" concert with Sophie. Current cellular phone systems and devices may require that she call Arjune, wait until connected, put Arjune on hold, then call Brittany, wait until connected, merge these calls, put the merged call on hold, then call Calvin, wait until connected, and then merge both of these calls into one conference call. Once this is done she may talk with all three friends at once.

The tools described in this document enable Sophie to quickly and easily create a communication group having these three friends. In one case the tools enable Sophie to select indicators, such as pictures or icons of these three friends, from her fifty-four contacts by dragging and dropping each from the contacts into a collection area on her cellular phone. In another case the tools populate these three friends automatically into a collection, such as because these three friends replied "yes" to an electronic invite from Sophie to go to the "Jars of Clay" concert, or because all of them are within 100 yards of Sophie (and all have indicated that they don't mind sharing their location information with each other).

Once this communication group is created, Sophie may instant message (or use any other form of communication) to communicate with all three friends at once by selecting this group, such as to tell everyone where to meet or ask what everyone wants to do after the concert.

In the following discussion, an example environment is first described in which the tools may enable a mobile-device user to create a communication group. Example procedures and interfaces are then described that may be employed in the example environment, as well as in other environments. Although these tools are described as employed within a mobile communication network and device environment in the following discussion, it should be readily apparent that these tools may be incorporated within a variety of environments without departing from the spirit and scope thereof.

Example Environment

Figure 1:
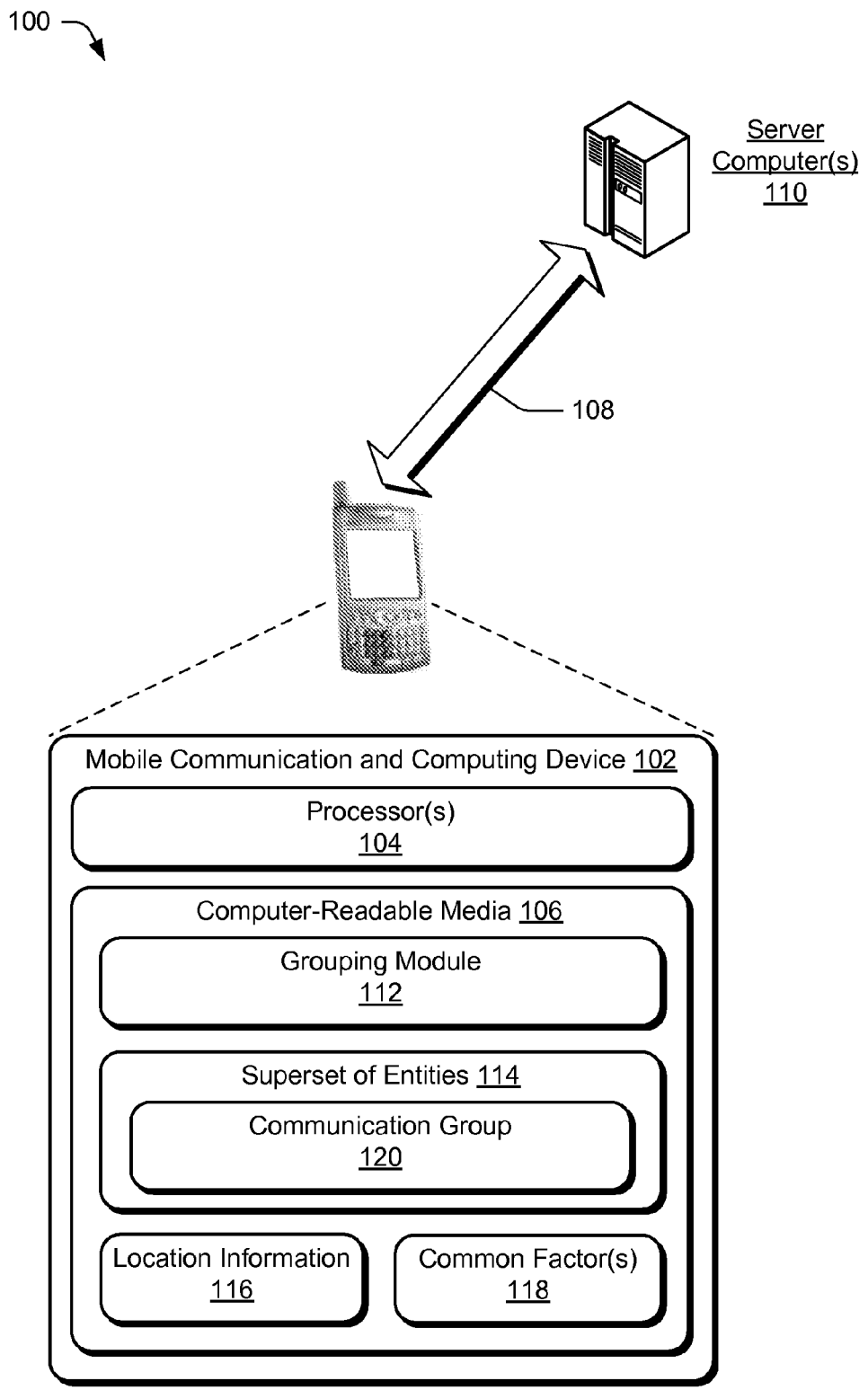
FIG. 1 is an illustration of an environment in which an example implementation of the tools may enable creating a communication group.

FIG. 1 is an illustration of an environment 100 in an example implementation in which the tools may operate to enable a mobile-device user to create a communication group. Environment 100 includes a mobile communication and computing device (a "mobile device") 102 including one or more processor(s) 104 and computer-readable media 106. The mobile device may also include or be communicatively coupled, through network connection 108, with server computer(s) 110. Although a single network connection 108 is shown, it may represent network connections achieved using a single network or multiple networks. For example, network connection 108 may be representative of a cellular phone network, an Internet Protocol (IP) network, or other network or group of networks capable of communicating wirelessly at least in part.

Mobile device 102 may be configured in a variety of ways. For example, the mobile device may be configured as a computer that is capable of communicating over network connection 108, such as a cellular phone or other mobile-communication-enabled device, such as a media player, personal digital assistant, or laptop computer. For purposes of the following discussion, the mobile device may also relate to a person and/or entity that operates the mobile device. In other words, mobile device 102 may describe a logical mobile device that includes a user, software, and/or a machine. In the following discussion, the mobile device may represent one or more entities and therefore reference may be made to a single entity (e.g., mobile device 102) or multiple entities (e.g., mobile devices 102).

Mobile device 102 includes computer-readable media 106, which includes a grouping module 112, a superset of entities 114, location information 116, and one or more common factors 118. Grouping module 112 is capable of enabling creation of communication group(s) 120 in various manners described herein. Superset of entities 114 includes entities from which entities may be collected as part of a process of creating a communication group. The superset of entities is shown including communication group 120 to show by way of illustration that entities making up a communication group may be those selected (automatically or by a user) from the superset of entities. Any communication group may have entities selected from various sources and stored separate from the superset of entities; this illustration is shown by way of example only. Types of communications by which a user may communicate with entities of a communication group include, by way of example only, instant messaging, email, video conferencing, text messaging, transmission of one or more files (e.g., photographic images), or conference calls.

Computing device 102 also includes location information 116 and common factor(s) 118. This location information 116 includes information about the computing device and other devices/entities, such as cellular triangulation data, cellular cell-based location data, Wi-Fi triangulation data, proximity data (e.g., signal strength data indicating an approximate distance between computing device 102 and another entity), and global positioning satellite data, to name a few. This information may be used to collect entities as part of building a communication group. Common factor(s) 118 may also be used to collect entities and may include information indicating that a common factor is present in some set of the superset of entities, such as some set of them having indicating a preference for a certain type of music, having accepted an invitation, having indicated a common interest, and communication having been made between them and the mobile device (e.g., a certain number of times and/or within a period of time).

Turning now to server computer(s) 110, these device(s) are capable of performing computations, providing location information 116, providing common factors 118, and providing other information or performing other computations that may assist the grouping module or work in conjunction with mobile device 102 and grouping module 112 to enable users to create communication groups. The server computer(s) may also coordinate and facilitate communication between mobile device 102 and other devices associated with various entities of the superset or communication group, as well as other entities and devices.

Mobile device 102 is illustrated as executing grouping module 112 on processor(s) 104. These processors are not limited by the materials from which they are formed or the processing mechanisms employed therein. For example, processors 104 may comprise semiconductor(s) and/or transistors (e.g., electronic integrated circuits (ICs)). In such a context, processor-executable instructions may be electronically-executable instructions. Additionally, media 106 may include a wide variety of types and combinations of memory, such as random access memory (RAM), hard disk memory, removable medium memory, and other types of computer-readable storage media.

Note also that one or more of the entities shown in FIG. 1 may be further divided, combined, and so on. Thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "tool" and "module," as used herein generally represent software, firmware, hardware, whole devices or networks, or a combination thereof. In the case of a software implementation, for instance, a module may represent program code that performs specified tasks when executed on a processor (e.g., CPU or CPUs). The program code can be stored in one or more computer-readable memory devices, such as computer-readable media 106. The features and techniques of the tools are platform-independent, meaning that they may be implemented on a variety of commercial computing platforms having a variety of processors.

Example Procedure with User Selection

The following discussion describes ways in which the tools may operate to enable creation of a communication group. Aspects of this procedure may be implemented in hardware, firmware, or software, or a combination thereof. The procedure is shown as a set of blocks that specify operations performed by the tools, such as through one or more modules or devices and are not necessarily limited to the orders shown for performing the operations by the respective blocks. In portions of the following discussion, reference may be made to environment 100 of FIG. 1.

Figure 2:
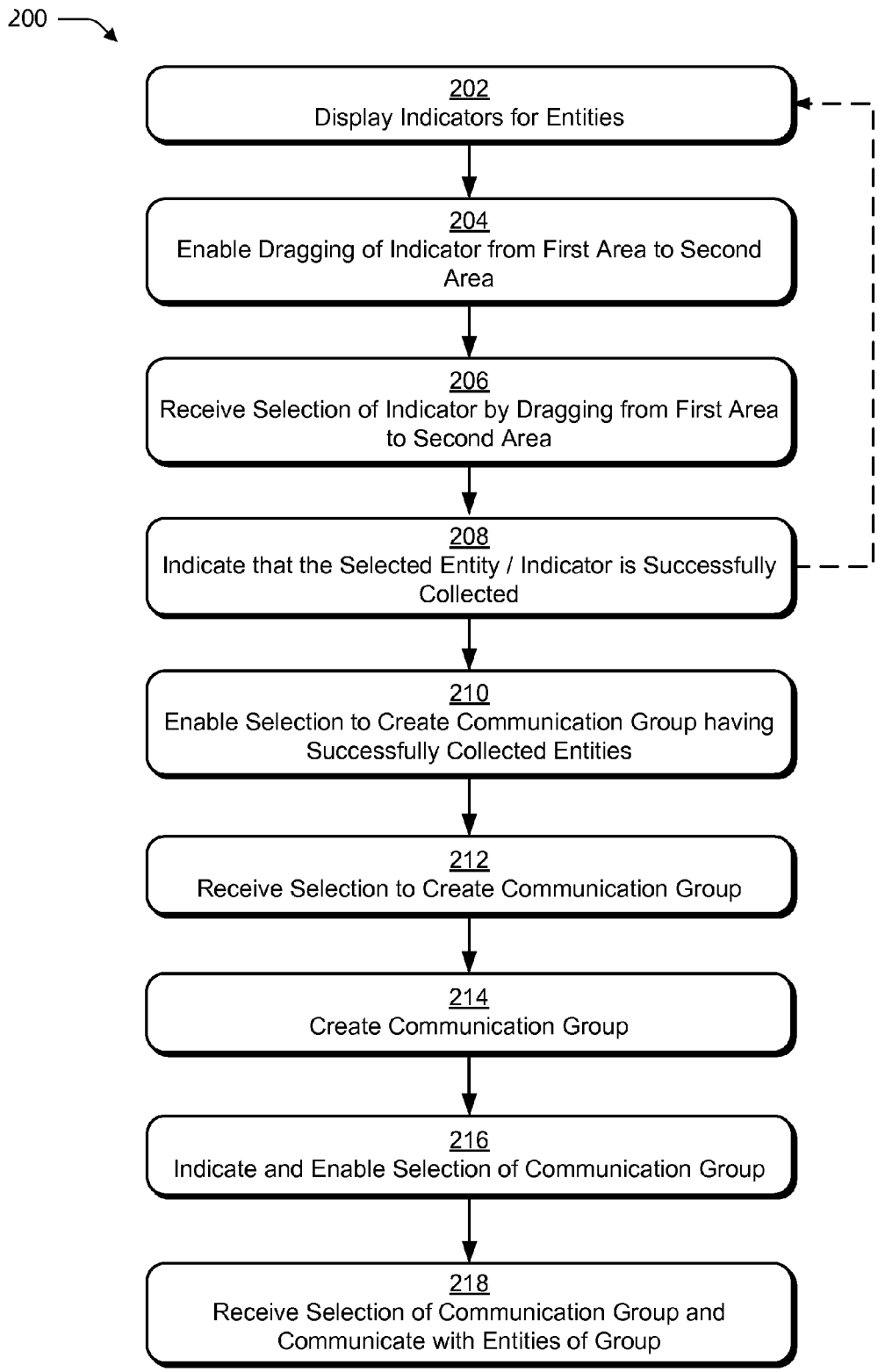
FIG. 2 is a flow diagram depicting a process in an example implementation by which the tools may act to enable creating a communication group responsive to receiving selection of entities for that group.

FIG. 2 depicts a procedure 200 in an example implementation in which the tools enable a user to select entities and then create a communication group having those selected entities. An example user interface, selection manner (e.g., drag and drop through a surface of a display), and display areas are described as part of this example procedure, though other user interfaces, selection manners, and displays are also contemplated.

Figure 3:
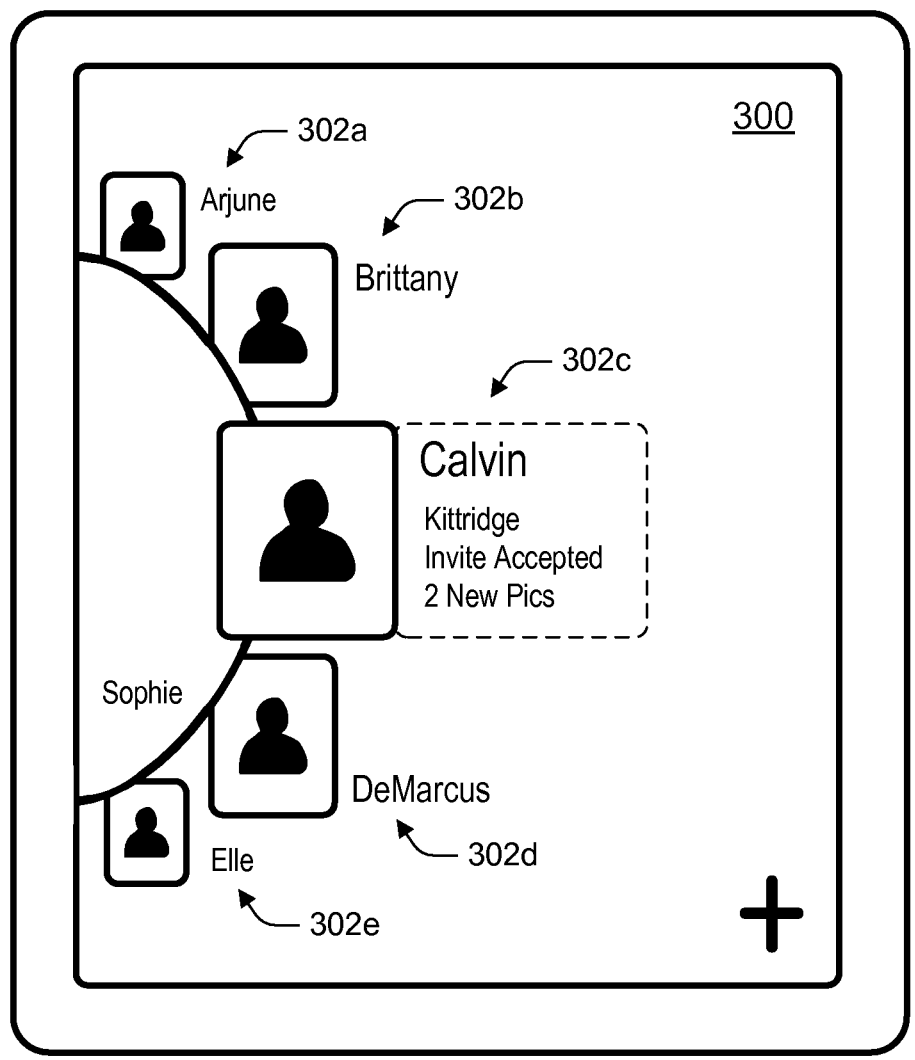
FIG. 3 illustrates an example user interface having indicators indicating entities of a superset of entities.

Block 202 displays indicators for entities from which a user may select to build a communication group, such as icons, photographic images, text, and the like for the user's contacts. By way of example, consider FIG. 3, which illustrates a user interface 300 having indicators 302a, 302b, 302c, 302d, and 302e indicating entities named "Arjune," "Brittany," "Calvin," "DeMarcus," and "Elle," respectively, of the superset of entities 114 of FIG. 1. These indicators are shown including icons and text. Note that various types and orientations of display areas and orientations may be used, such as lists of contacts, groups of icons or pictures, tables, and the like, in addition to the arc orientation shown in FIG. 3. This example arc orientation displays at least some of the indicators for the superset of entities visually attached to an arc.

Figure 4:
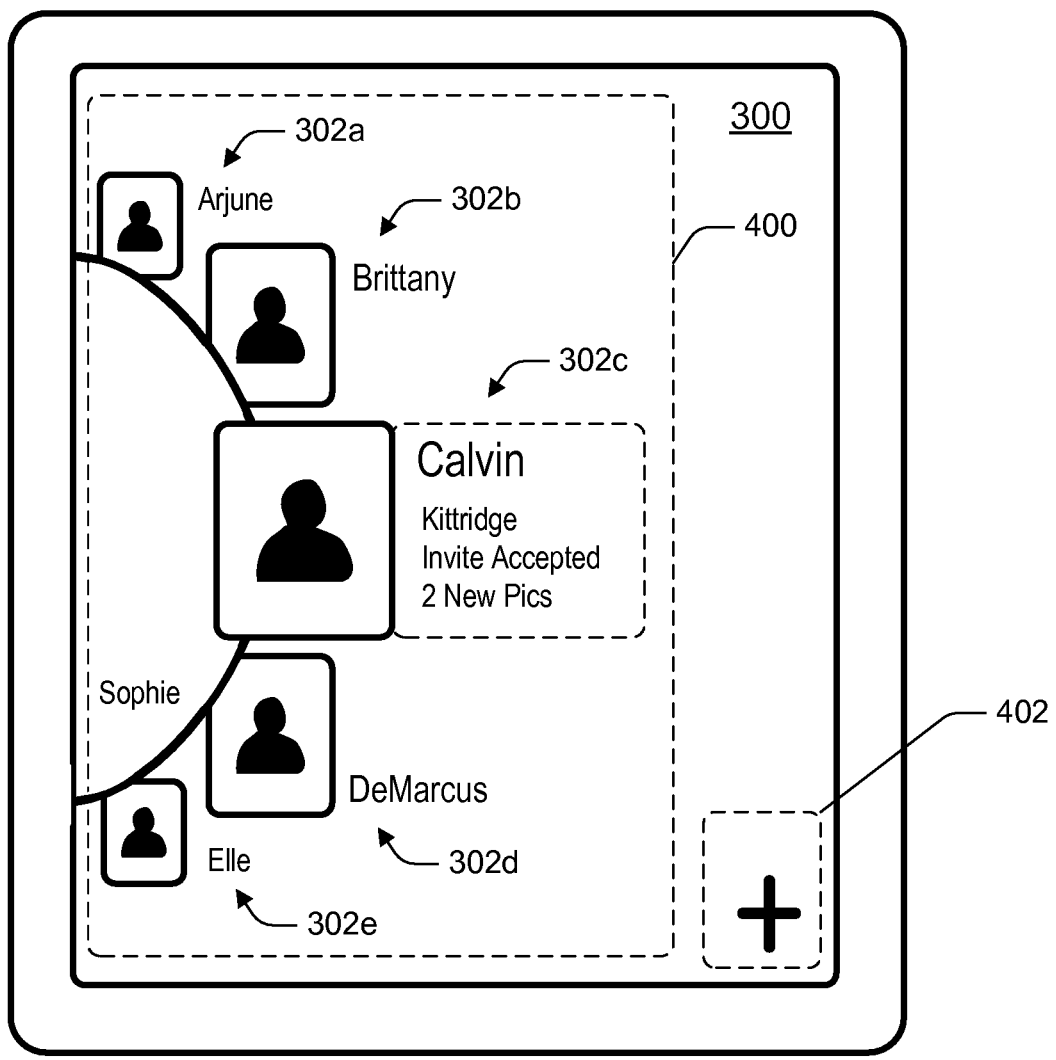
FIG. 4 illustrates an example entity selection area and a collection area of the example user interface of FIG. 3.

Block 204 enables dragging, from a first area of a display of a mobile device, an indicator indicating an entity into a second area of the display of the mobile device, as well as selecting through other manners, such as through a keyboard, voice activation, or drop-down list. Continuing the ongoing example, consider FIG. 4, which illustrates an entity selection area 400 and a collection area 402. The entity selection area displays selectable entities via indicators, such as those for Sophie's contacts named "Arjune," "Brittany," "Calvin," "DeMarcus," and "Elle." The collection area displays a plus symbol, though various symbols, graphics, and the like may be used, such as a bucket or corral symbol, to name a few.

Figure 5:
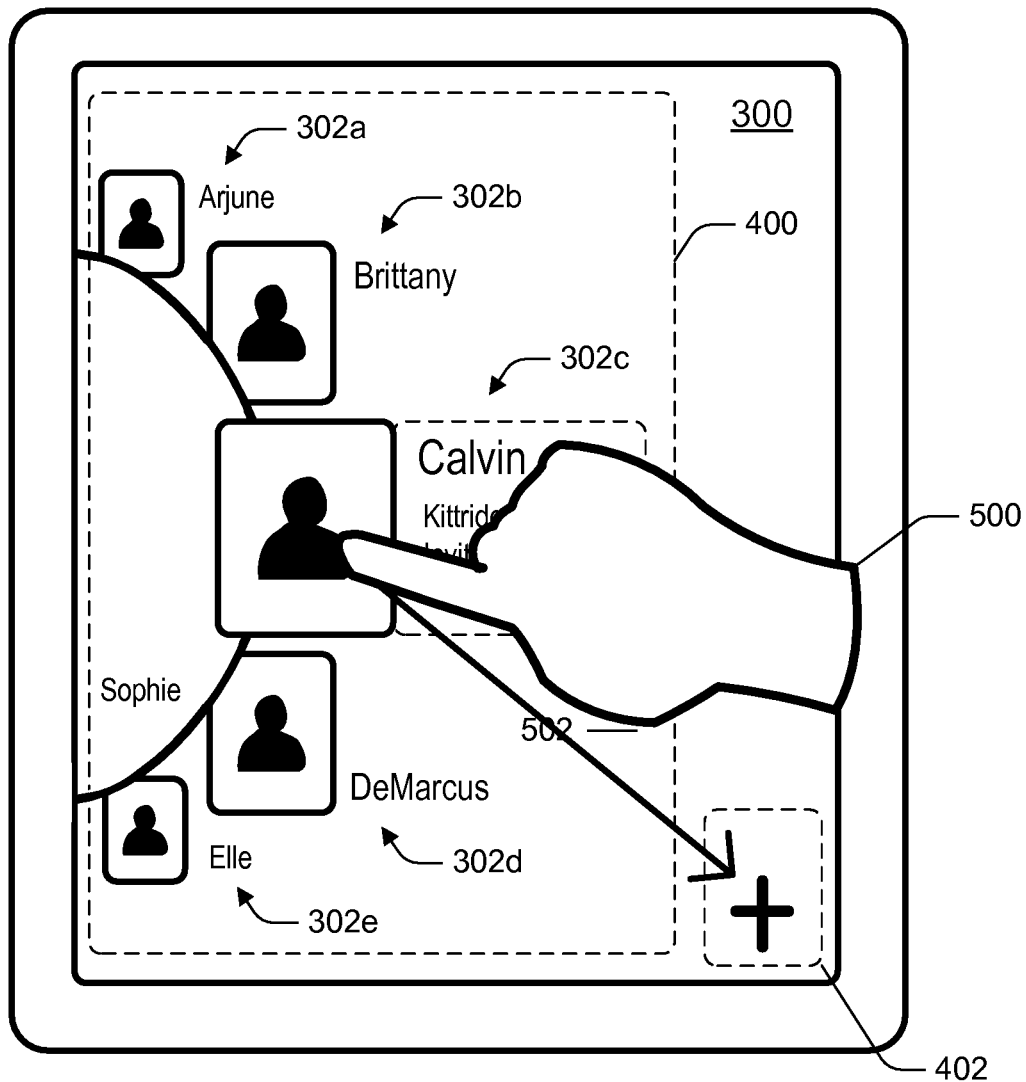
FIG. 5 illustrates a person's hand dragging an indicator from the selection area of FIG. 4 to the collection area of FIG. 4.

Block 206 receives selection of an indicator (e.g., through dragging of the indicator from a first area of a display of a mobile device to a second area of the display of the mobile device). Consider the example of FIG. 5, which illustrates a person's hand 500 (here a fingertip) dragging indicator 302c (or the accompanying graphic) for "Calvin" along arrow 502 from selection area 400 to collection area 402. This example shows a human fingertip causing the dragging selection, though a stylus or manners may also be used.

Block 208 indicates that an entity associated with the selected indicator is successfully collected. This successful collection either increases a collection of entities or is the first of a collection of entities that may later be selected to become a communication group (e.g., one of communication group(s) 120 of FIG. 1). The tools, such as through grouping module 112, may indicate that the entity is collected by showing the indicator for the entity (e.g., the icon or text or both of FIG. 5 for "Calvin") as being dragged along the screen and then dropped (e.g., the indicator disappearing or shrinking and disappearing) once it contacts with collection area 402.

Figure 6:
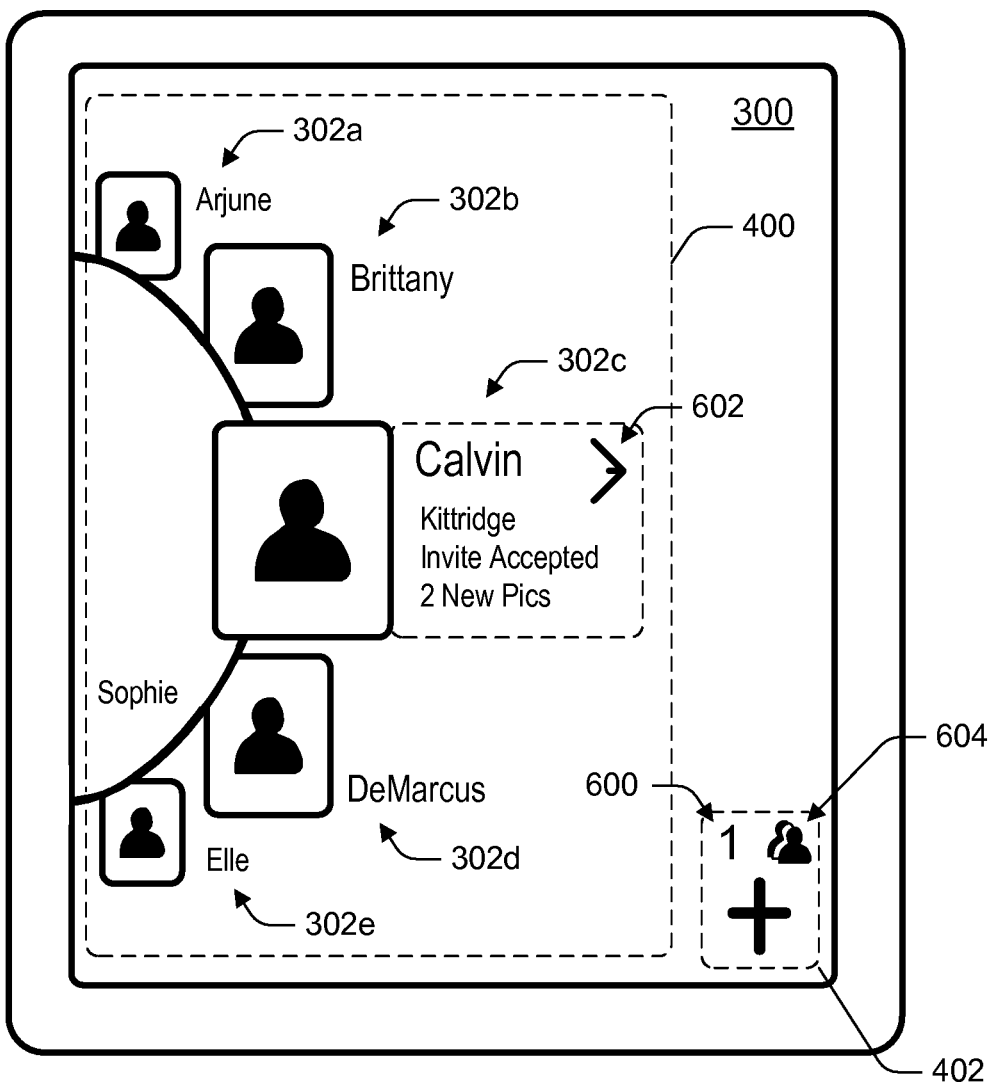
FIG. 6 illustrates example indicators indicating collected entities in the selection area and the collection area of FIG. 4.

The tools may also or in addition indicate successful collection by altering one or both of the areas, such as by incrementing or displaying a quantity of collected entities in collection area 402 (e.g., with a number, hash marks, or dots). Consider the example indication of FIG. 6. FIG. 6 illustrates a counter 600 of collected entities, here "1" marked in collection area 402. Block 208 may also indicate the collection in selection area 400, also shown in FIG. 6. Here this indication is with a collected symbol 602.

The tools may also indicate that a collection of entities for future selection into a group has begun, such as through a collection group symbol 604, shown in FIG. 6.

The tools may perform blocks 202, 204, 206, and/or 208 again and again effective to enable a user to select additional indicators and their associated entities into a collection. This is shown with a dashed line from block 208 to block 202. Continuing the ongoing example, assume that Sophie next selects indicator 302a (for Arjune) and then indicator 302b (for Brittany). After dragging each of these indicators into collection area 402, the tools indicate that these entities are successfully collected (shown with counter 600 incremented to "3" in FIG. 7). Assume that Sophie selects Brittany and then Arjune, after which there are three collected entities. Assume also that in selecting these indicators Sophie moved them into the largest portion of the arc (where Calvin's indicator 302c is shown in FIGS. 3, 4, 5, and 6). At this point selection area 400 may also indicate successful collection, such as with collected indicators 702a, 702b, and 702c shown in FIG. 7 (note that 702c is a smaller version of collection symbol 602 of FIG. 6).

Block 210 enables selection to create a communication group having the collected entities. The tools may enable this selection in various manners, such as through a drop-down menu, through enabling a tap by a stylus or finger on the second area, through a dragging of an indicator to the collection area and the stylus or finger holding on the second area for a period of time after the drop of the indicator into the second area, or through enabling returning, after dropping a last indicator and without removing the finger or stylus, the finger or stylus back from collection area 402 to selection area 400.

Block 212 receives selection to create a communication group. In the ongoing example, after Sophie selected her three friends into the collection, she is able to view, at FIG. 7, indicators indicating that three entities and which three were selected (with indicators 702a, 702b, and 702c). She then taps on collection area 402, which is received by grouping module 112 and is understood as indicating the user's desire to create a communication group having the collected entities.

Figure 7:
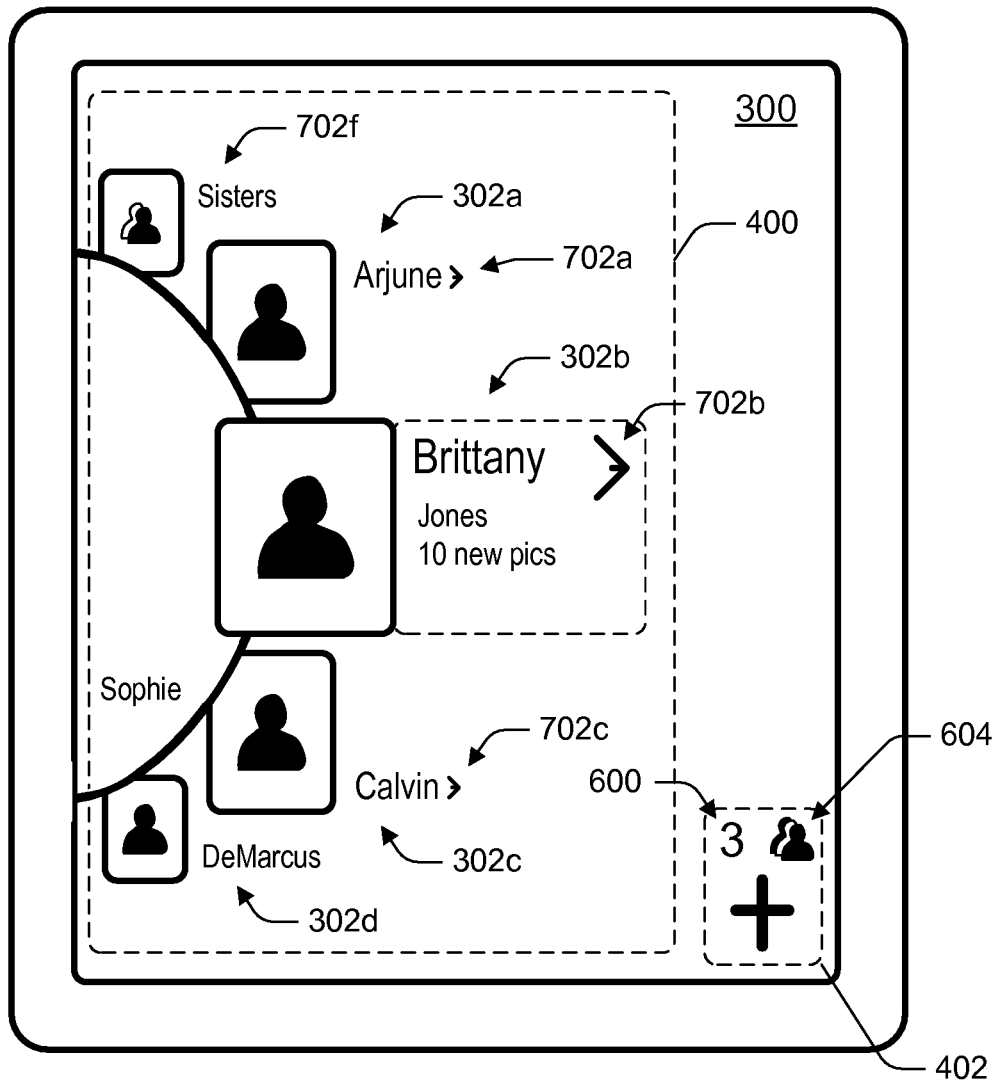
FIG. 7 illustrates example indicators indicating three entities that were selected, as well as other information.

Note indicator 702f of FIG. 7—this indicator indicates that the "Sisters" entity is selectable. While not described in this example, the tools permit selection of an indicator representing multiple people, such as a previously created communication group. Here the "Sisters" entity represents Sophie's two sisters, each of which has her own cellular phone. The tools permit a user to select a communication group into a larger collection for creation as a larger communication group, such as if Sophie selected here sisters into the communication group she is building.

Block 214 creates a communication group. As noted above, this communication group (e.g., communication group 120 of FIG. 1) may enable communication from mobile device 102 to all of the entities in the communication group at once and without further selection of any one of those entities. Thus, on selection of this communication group Sophie may communicate with Arjune, Brittany, and Calvin at once.

Block 216 indicates and enables selection of the created communication group. The tools may do so, for example, with a selectable icon or other graphic representation, and/or with a picture, alphanumeric text, and the like.

Figure 8:
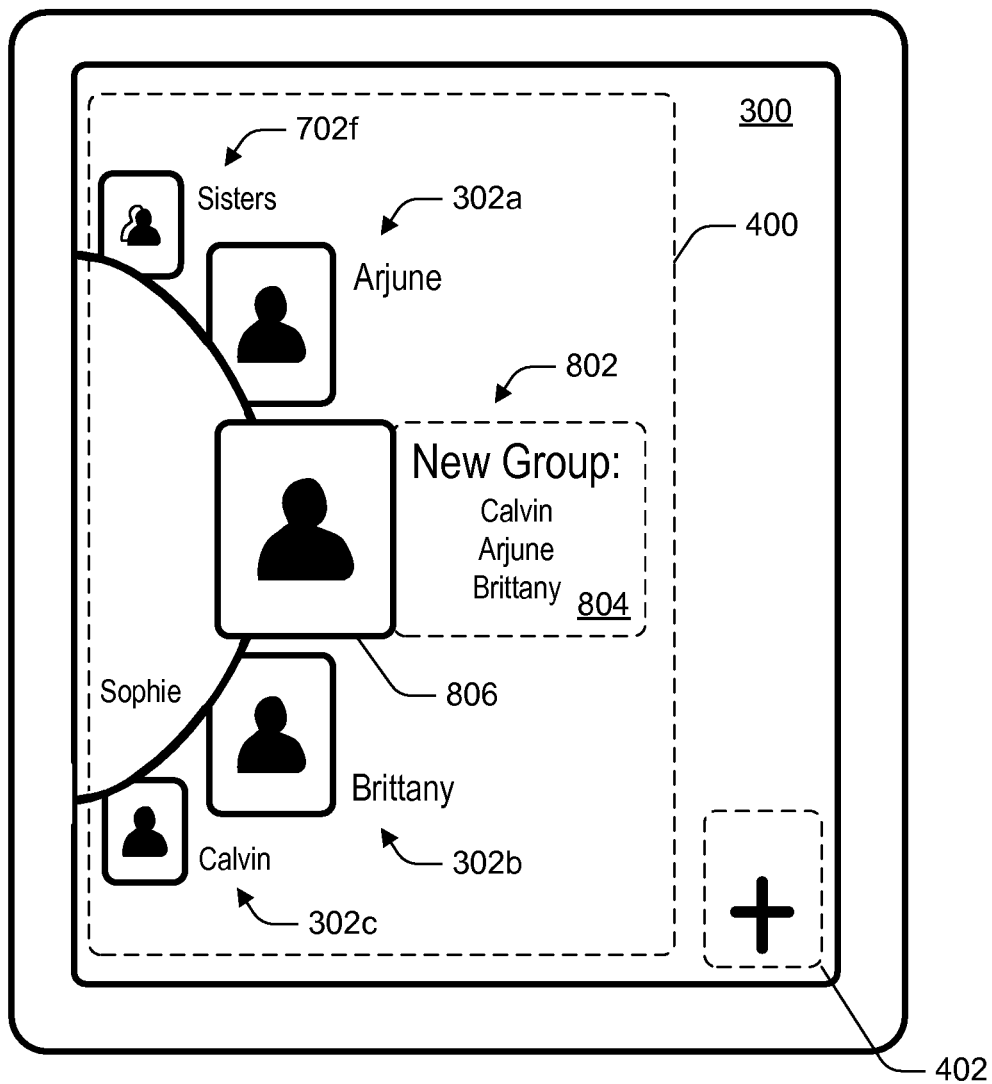
FIG. 8 illustrates an example communication group indicator.

In the ongoing embodiment, grouping module 112 adds a communication group indicator 802, shown in FIG. 8, representing the created communication group and in selection area 400. This indicator includes text at 804 as well as a graphic representation 806. It also indicates this creation by removing counter 600, collection group symbol 604, and collected indicators 702a, 702b, and 702c from selection area 400. This is also illustrated in FIG. 8. Here the collection group is given a temporary name by collection module 112 ("New Group: Calvin Arjune Brittany"), though Sophie can change this name if desired.

Block 218 receive selection of the communication group and, responsive to this selection, communicates with all of the entities of the communication group. Here Sophie taps on the communication group indicator 800 and her cellular phone calls Arjune, Brittany, and Calvin at once. She does not have to select Arjune, or Brittany, or Calvin separately. She also does not have to set up a conference call other than the single tap on the communication group indicator 802.

Example Procedure with Auto-Populate

The following discussion describes ways in which the tools may operate to enable creation of a communication group. Aspects of this procedure may be implemented in hardware, firmware, or software, or a combination thereof. The procedure is shown as a set of blocks that specify operations performed by the tools, such as through one or more modules or devices and are not necessarily limited to the orders shown for performing the operations by the respective blocks. In portions of the following discussion, reference may be made to the environment 100 of FIG. 1.

Figure 9:
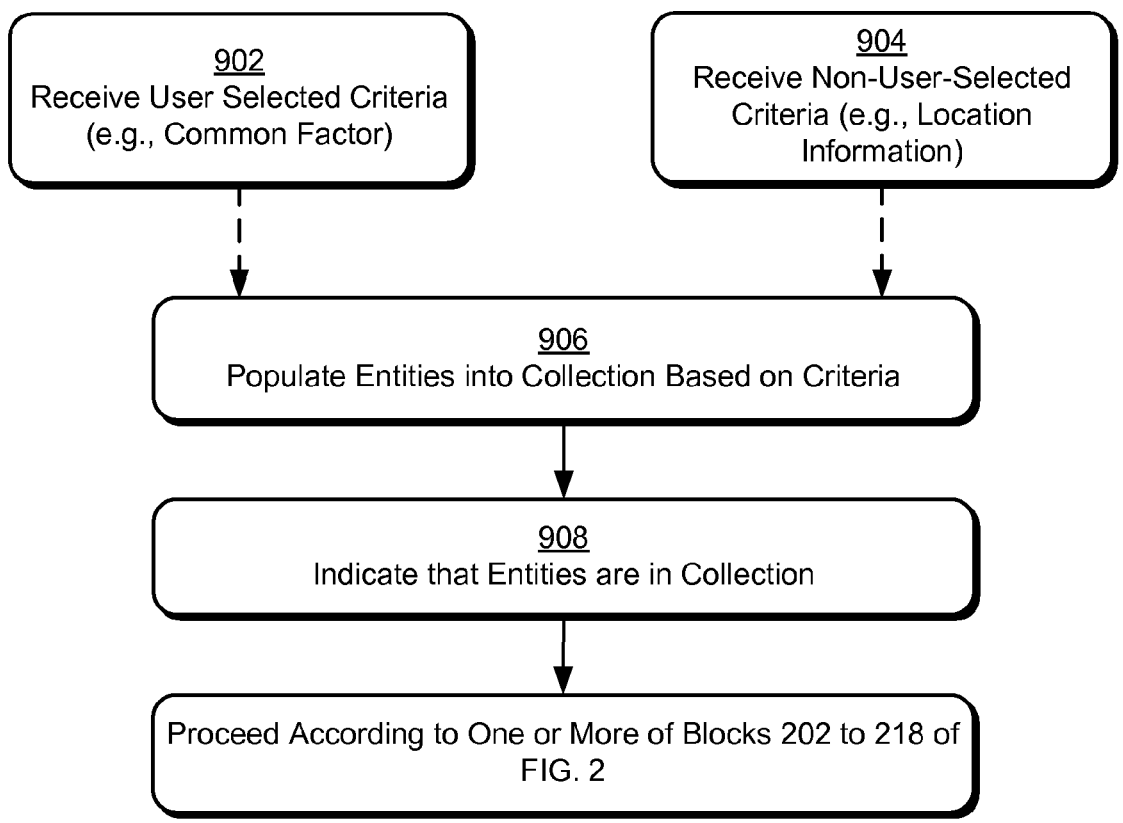
FIG. 9 is a flow diagram depicting a process in an example implementation by which the tools may act to enable creating a communication group with automatically populating entities into a collection.

FIG. 9 depicts a procedure 900 in an example implementation in which the tools populate a collection of entities from which a user may select to create a communication group.

This procedure may begin with user-selected or non-user-selected criteria (or both) on which to base populating entities from a superset of entities into a collection. Block 902, for example, receives user-selected criteria by which to determine which entities of a superset of entities to collect. One such criteria includes a common factor (e.g., one of common factors 118 of FIG. 1) by which the tools populate a collection of entities, though common factors may also be non-user-selected.

By way of example, assume that Sophie Carmichael, from the above example of FIG. 2, wants to create a communication group of people that have responded positively to an electronic invitation. Thus, those of her contacts (e.g., superset of entities 114) that respond "Yes" to her invitation to go to the "Jars of Clay" concert have this common factor. Assume that Arjune, Brittany, and Calvin responded with a "Yes" to Sophie's invitation. She may then or previously select that all "Yes" responders be added to a collection.

Also by way of example, assume that Sophie runs a search of her contacts (e.g., superset of entities 114) and finds those contacts that have indicated a preference for going to concerts. Based on this common factor of indicating a preference, Sophie may select to collect these entities.

Block 904, on the other hand, receives non-user-selected criteria. These criteria can include many different common factors or criteria, such as those described above. By way of example, assume that Arjune, Brittany, and Calvin are friends of Sophie and are known to be within 200 yards of Sophie. The tools may receive this information from a remote source, such as server computer(s) 110, or may be determined by mobile device 102. Either because the user selected to collect entities based on location or automatically and without user interaction, the tools may collect these entities.

Block 906 populates two or more entities from a superset of entities associated with a user into a collection of entities, the populating based on one or more criteria. As noted, the tools may proceed with user-selected, non-user-selected, or both types of criteria. Thus, in some cases the tools may populate these entities into a collection automatically and without user interaction, such as with receipt of location information without user selection or interaction (e.g., from server computer(s) 110). The tools may also populate these entities based on user-selected criteria in which case the tools populate these entities automatically but responsive to user interaction (e.g., common factors selected by the user). Continuing the ongoing example, assume that Arjune, Brittany, and Calvin are collected based on them being within 200 yards of Sophie.

Note that the tools may receive criteria and populate the two or more entities locally at mobile device 102 or in combination with a remote device, such as when server computer(s) 110 receive GPS information, compute each entity's location, determine that the location is within a stored, pre-set distance, and indicate that the determined entities are populated or should be populated by grouping module 112.

Figure 10:
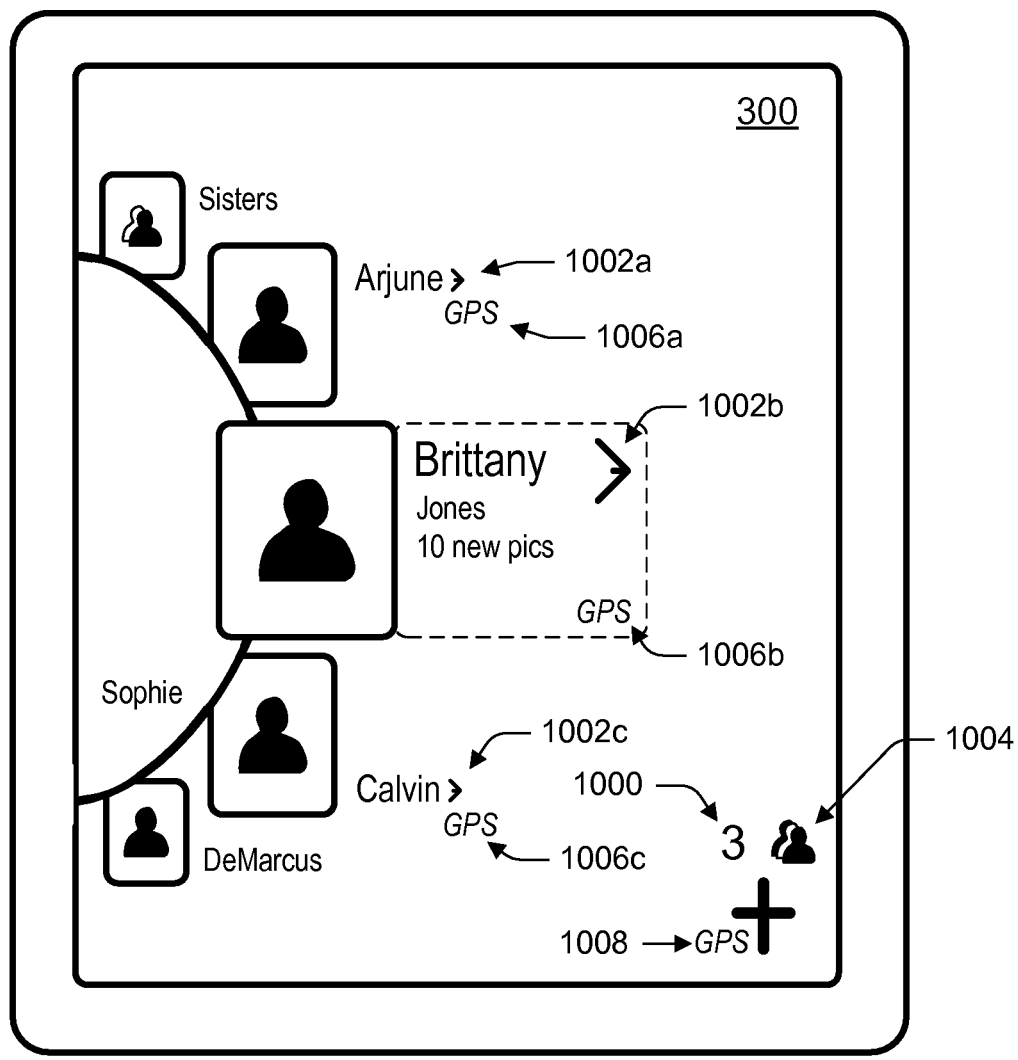
FIG. 10 illustrates example ways in which the tools may indicate that entities are collected.

Block 908 indicates the populating of the two or more entities into the collection of entities. The tools indicate that a collection has been populated and that the user may select to create a communication group of the entities of the collection. Consider FIG. 10, which illustrates one way in which the tools, using grouping module 112, may indicate that entities are collected. FIG. 10 shows a counter 1000, collected indicators 1002a, 1002b, and 1002c, and collection group indicator 1004 (all of which are similar to the similar-numbered items of FIG. 6). These indicators 1002 visually differentiate the indicators that are collected from those of the other indicators (e.g., "Sisters" and "DeMarcus").

In a further embodiment of the invention, created groups are filterable. Specifically, the icon created for a group is typically used to communicate with all of the members of the group. In this further embodiment, selecting an icon brings up filter options, for example, filtering the members to those who have said "yes" to an invitation as discussed in the example above. Once filtered, the user can communicate with just that subset of members of the communication group by activating the icon. In one embodiment, the icon for the now-filtered communication group is demarcated in some way (e.g. turned a different color) to let the user know that the icon represents a communication group that is in a filtered state. The user can then continue to use the filtered communication group through a version of the icon that indicates that the communication group is in a filtered state (the "filtered icon") until the user changes the filter settings.

Various filters settings may be used. In one case, for example, filter settings are invitation based, such as filtering out of a communication group invitees that have declined an invitation. In another case, the filter settings can be based on any parameter capable of differentiating between members of a communication group, such as those settings that are effective to filter a set of friends who are local, or who share some other common parameter. In a further embodiment, a user is given an option to create a new group and new icon for the filtered group. This allows the user to make permanent any particular group that they find is of use.

The tools may indicate the criteria (e.g., the above filter settings or options) used to build a communication group or a filtered (subset) of a communication group. In one example the tools collect Arjune, Brittany, and Calvin into a collection based on them being within 200 yards of Sophie. FIG. 10 shows co-location indicators for each of the three collected entities at 1006a, 1006b, and 1006c, the indicators here indicating that the entities have a physical location within some pre-set distance of the user's mobile device 102 and that the location was determine using a Global Positioning Satellite with "GPS." FIG. 10 also shows a collection group criteria indicator 1008 as well, which also indicates the type of criteria used.

At this point the tools may proceed with any or all of the actions of blocks 202-218. The tools may enable the user to drag and drop or otherwise select to add another entity to the collection, select to create a communication group with these entities, indicate that the communication group has been created, and/or so forth. On selection and creation of a communication group, for example, the tools may indicate this creation similar to as shown in FIG. 8.

In addition to the example embodiments set forth above, the tools also enable creation of a communication group in other manners. In one embodiment, an email may be selected from the user's inbox to create a communication group. Specifically, a user may access their email inbox on a phone and select a particular email and drag that email to the desktop of the phone. The tools (e.g., grouping module 112 applied to telephone systems) intelligently interpret the action to identify the contacts present on the distribution list of the email and create a communication group. The communication group can then be used to call or message all of the members of the group. For example, if the email is a discussion about meeting later, the user can use this group to contact the other members when the time grows near to confirm attendance. In one further embodiment, the phone can alert the user when members of the group have reached the location using its location technology. The user can be alerted by a flashing of the icon or the like. This feature enables the user to understand when members of the party have arrived at the desired location. In a further embodiment of the invention the phone software interprets location information on the email to use as the basis for determining the arrival point against which to compare the other user's location.

One further advantage of an embodiment of the invention is the use of ephemeral groups. This aspect of the present invention improves the user experience by creating a user experience in which groups are disposable, or expirable. Adding this feature to group creation encourages use of this feature for everyday events by allowing creation of groups but avoiding cluttering up the device user interface and therefore encourages use of the group feature overall to create a more satisfying experience for the user. Specifically, the user can create a group as in the above example that is merely for the purpose of tracking a particular event. The group created lives until the event has concluded and then after the event has passed is moved to a separate location off the desktop, or off a most-used group list, or the like. In the embodiment of this aspect of the invention where a subset of groups are only displayed on the desktop, as the event approaches the group included in that subset is removed after the event is over.

These old, timed-out, or otherwise ephemeral groups may be deleted to save memory. In another embodiment, these groups are moved to an "old group" folder or the like. In still another embodiment the user enters the event date to allow the device to track this timing or the device intelligently determines the date of the event, for example by examining the email or invite from which the group was based (if the group creation was based on an email or invite). With this date the tools may determine when to move the group off of the device's user interface (by deleting or moving to some other location).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable storage media device(s) having computer-readable instructions therein that, when executed by a mobile communication and computing device, cause the mobile communication and computing device to perform acts comprising:
    enabling dragging, from a first area of a display of the mobile communication and computing device, a first indicator indicating a first entity into a second area of the display of the mobile communication and computing device, the first and second areas displayed on a same screen of the display;
    receiving selection of the first indicator through dragging of the first indicator from the first area of the display to the second area of the display;
    indicating that the first entity is successfully collected to or is the first of a collection of entities;
    enabling dragging, from the first area of the display to the second area of the display, a second indicator indicating a second entity;
    receiving selection of the second indicator through dragging of the second indicator from the first area of the display to the second area of the display;
    indicating that the second entity is successfully added to the collection;
    enabling selection using touch functionality of the mobile communication and computing device, either after the act of indicating that the second entity is successfully added to the collection or at some later time after one or more additional entities are successfully added to the collection, to create a communication group having the entities of the collection;
    receiving selection to create the communication group; and
    creating the communication group at the mobile communication and computing device, the communication group enabling at least text messaging communication from the mobile communication and computing device to all of the entities of the communication group at once, communications sent via the text messaging communication configured to display on one or more display devices associated with the entities of the communication group.

2. The media of claim 1, wherein the act of enabling selection to create the communication group enables selection with a tap on the display at the second area.

3. The media of claim 1, wherein the display is capable of receiving a dragging selection through a surface of the display and using a fingertip, and wherein the acts of enabling dragging enable dragging using a fingertip.

4. The media of claim 1, wherein the act of indicating that the first entity is successfully collected comprises the first indicator disappearing when the first indicator fully or partially contacts the second area.

5. The media of claim 1, wherein the act of indicating that the second entity is successfully collected comprises causing a counter to increment.

6. The media of claim 1, wherein the first area comprises a superset of indicators from which the first indicator for the first entity is selected and from which the second indicator for the second entity is selected.

7. The media of claim 6, wherein the indicators of the superset of indicators are presented on the display around an arc.

8. The media of claim 1, wherein the act of indicating that the first entity is successfully collected and the act of indicating that the second entity is successfully collected are performed within the second area.

9. The media of claim 1, wherein the act of indicating that the first entity is successfully collected and the act of indicating that the second entity is successfully collected are performed within the first area.

10. The media of claim 1, further comprising:
    presenting, in the display of the mobile communication and computing device, a graphic representation of the communication group;
    enabling selection of the graphic representation of the communication group; and
    responsive to receiving selection of the graphic representation of the group, communicating with all of the entities of the communication group at one time.

11. The media of claim 10, wherein the act of communicating with all of the entities of the communication group at one time is performed without receiving selection of any of the entities of the group separately from receiving selection of the communication group.

12. The media of claim 1, wherein the first entity or second entity comprises two or more persons.

13. The media of claim 1, further comprising receiving selection from a user of the mobile communication and computing device to communicate with the communication group and communicating with the entities of the communication group responsive to said selection from the user, the communicating with the entities comprising a conference call, a text message, a transmission of a file, email, video conference, or an instant message.

14. One or more computer-readable storage media device(s) having computer-readable instructions therein that, when executed by a mobile communication and computing device, cause the mobile communication and computing device to perform acts comprising:
- populating two or more entities from a superset of entities associated with a user into a collection of entities, the populating performed automatically based on one or more criteria;
- indicating, on a display of the mobile communication and computing device, the populating of the two or more entities into the collection of entities;
- enabling selection using touch functionality of the mobile communication and computing device to create a communication group having the entities of the collection;
- receiving selection to create the communication group; and
- creating the communication group at the mobile communication and computing device, the communication group enabling text and voice communication from the mobile communication and computing device to the two or more entities of the communication group, the text communication or the voice communication enabled from the mobile communication and computing device to the two or more entities of the communication group at once.

15. The media of claim 14, wherein the one or more criteria comprise a physical location or proximity of the two or more entities within a distance of the mobile communication and computing device.

16. The media of claim 14, wherein the act of populating is performed without user interaction.

17. The media of claim 14, wherein the one or more criteria comprise: communication with the mobile communication and computing device within a first period of time; communication with the mobile communication and computing device a certain number of times within a second period of time; or acceptance of an invitation from the mobile communication and computing device.

18. The media of claim 14, wherein the act of populating comprises receiving the two or more entities from a computing device, the computing device being remote from the mobile communication and computing device.

19. The media of claim 14, further comprising, prior to the act of receiving selection to create the communication group, enabling and receiving selection of an indicator associated with a third entity, and wherein the communication group comprises the third entity.

20. A method implemented at least in part by a mobile communication and computing device comprising:
- receiving selection of two or more entities of a superset of entities via a touchscreen, the superset of entities displayed at least in part on a first area of a display of the mobile communication and computing device, the selection received through dragging an indicator for each of the two or more entities from the first area of the display to a second area of the display and dropping the indicator for each of the two or more entities into the second area of the display, the first and second areas displayed on a same screen of the display;
- indicating a quantity of entities dragged and dropped into the second area of the display, the indicating with a number, dots, or hash marks;
- receiving a tap at the second area of the display;
- creating, responsive to receiving the tap at the second area of the display of the mobile communication and computing device, a communication group comprising the two or more entities;
- displaying a communication group indicator indicating the communication group and in the first area of the display;
- receiving selection of the communication group indicator; and
- responsive to receiving the selection of the communication group indicator, communicating through instant messaging, email, video conference, text messaging, transmission of a file, or a conference call with the two or more entities of the communication group, the text messaging configured to display on one or more display devices associated with the two or more entities comprising the communication group.

* * * * *